US010111157B2

United States Patent
Kim et al.

(10) Patent No.: US 10,111,157 B2
(45) Date of Patent: Oct. 23, 2018

(54) METHOD AND APPARATUS FOR RECONFIGURING MBMS MDT IN WIRELESS COMMUNICATION SYSTEM

(71) Applicant: LG ELECTRONICS INC., Seoul (KR)

(72) Inventors: Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 15/117,108

(22) PCT Filed: Mar. 4, 2015

(86) PCT No.: PCT/KR2015/002060
§ 371 (c)(1),
(2) Date: Aug. 5, 2016

(87) PCT Pub. No.: WO2015/137656
PCT Pub. Date: Sep. 17, 2015

(65) Prior Publication Data
US 2017/0181062 A1      Jun. 22, 2017

Related U.S. Application Data

(60) Provisional application No. 61/952,887, filed on Mar. 14, 2014.

(51) Int. Cl.
*H04W 48/10* (2009.01)
*H04W 72/00* (2009.01)
*H04W 4/06* (2009.01)

(52) U.S. Cl.
CPC ............. *H04W 48/10* (2013.01); *H04W 4/06* (2013.01); *H04W 72/005* (2013.01)

(58) Field of Classification Search
CPC ......... H04W 24/10; H04W 36/0055–36/0077; H04W 48/10; H04W 72/005; H04W 76/002
See application file for complete search history.

(56) References Cited

U.S. PATENT DOCUMENTS

2013/0128756 A1*   5/2013   Zhang ................... H04W 24/10
                                                                  370/252
2014/0056169 A1    2/2014   Jung et al.
(Continued)

FOREIGN PATENT DOCUMENTS

WO    WO 2012/093875 A2    7/2012
WO    WO 2012/148203 A2    11/2012
(Continued)

*Primary Examiner* — Pao Sinkantarakorn
(74) *Attorney, Agent, or Firm* — Birch, Stewart, Kolasch & Birch, LLP

(57) ABSTRACT

A method and apparatus for reconfiguring multimedia broadcast multicast service (MBMS) minimization of drive test (MDT) in a wireless communication system is provided. A user equipment (UE) receives a value tag for MBMS-MDT, and determines whether to perform MBMS-MDT reconfiguration by comparing the received value tag for MBMS-MDT with a stored value tag for MBMS-MDT. If the received value tag for MBMS-MDT and the stored value tag for MBMS-MDT are different from each other, the UE performs the MBMS-MDT reconfiguration. Alternatively, if a paging message includes an indicator of modification of the MBMS-MDT configuration, the UE acquires the MBMS-MDT configuration and performs the MBMS-MDT reconfiguration.

8 Claims, 9 Drawing Sheets

(56) References Cited

U.S. PATENT DOCUMENTS

2014/0228016 A1* 8/2014 Futaki .................. H04W 24/10
                                                    455/422.1
2015/0359011 A1* 12/2015 Wang .................. H04W 76/002
                                                    370/312

FOREIGN PATENT DOCUMENTS

WO    WO 2013/051834 A1    4/2013
WO    WO 2014/017792 A     1/2014

* cited by examiner

[Fig. 1]
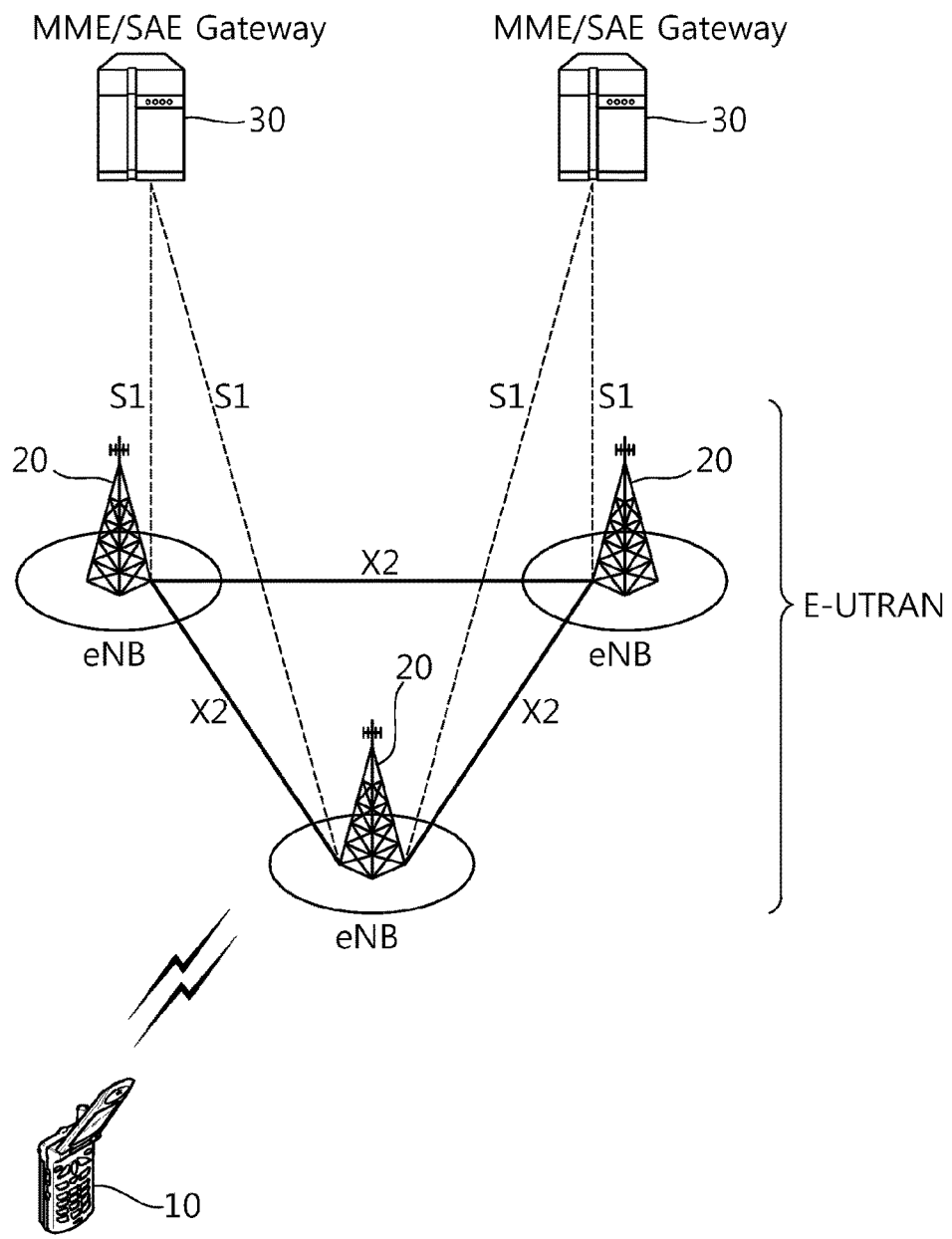

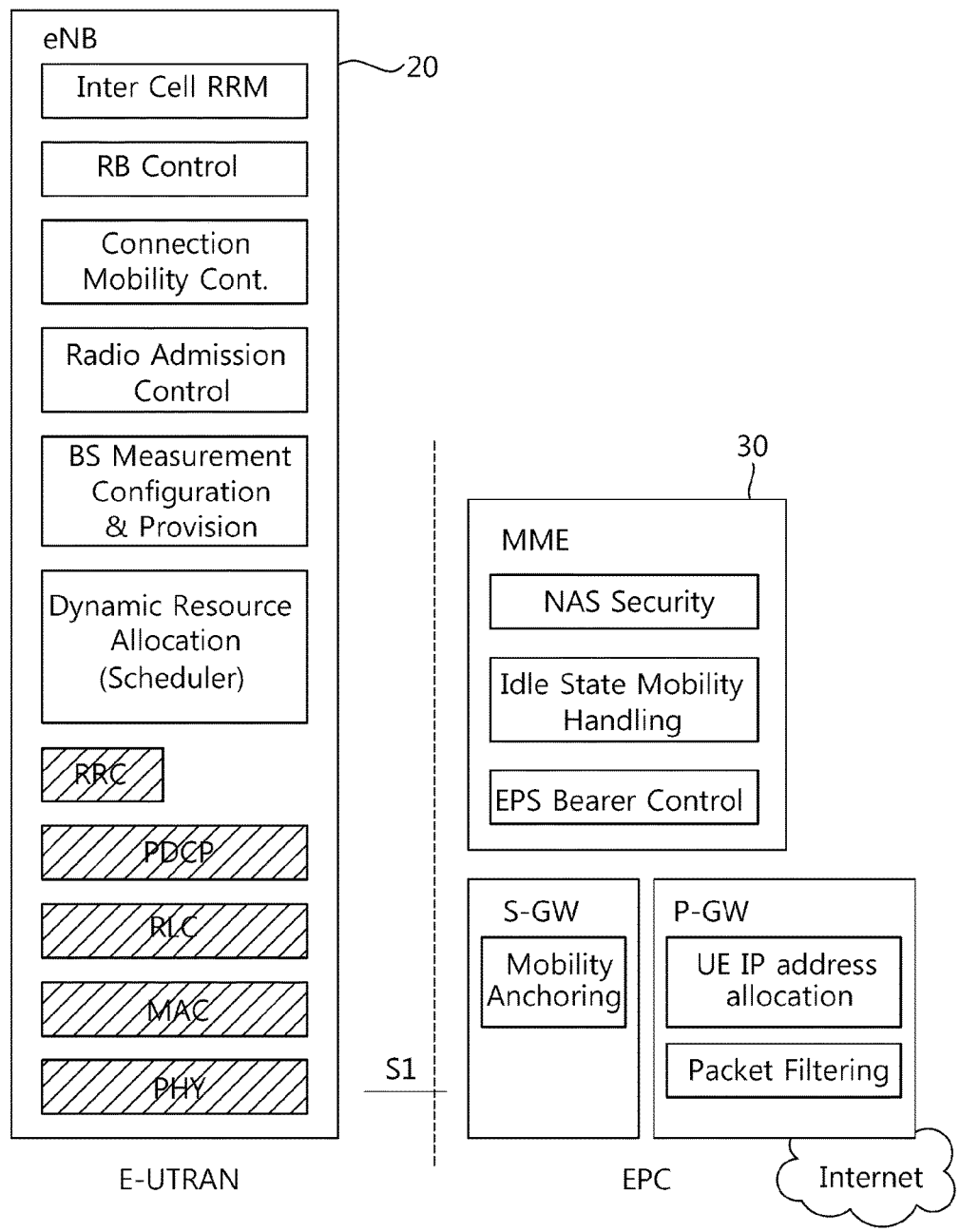
[Fig. 2]

[Fig. 3]
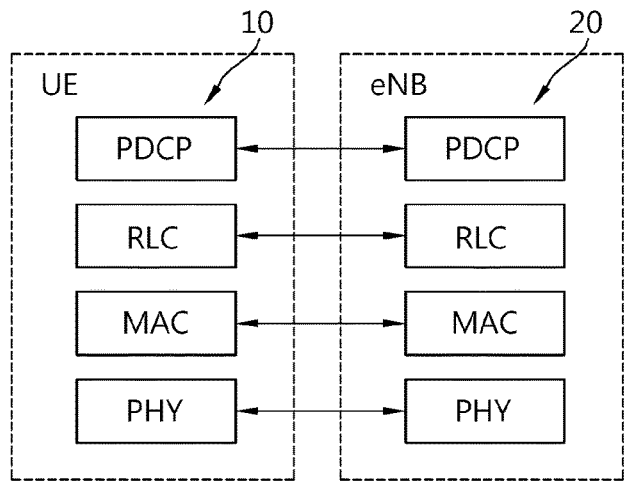
[Fig. 4]
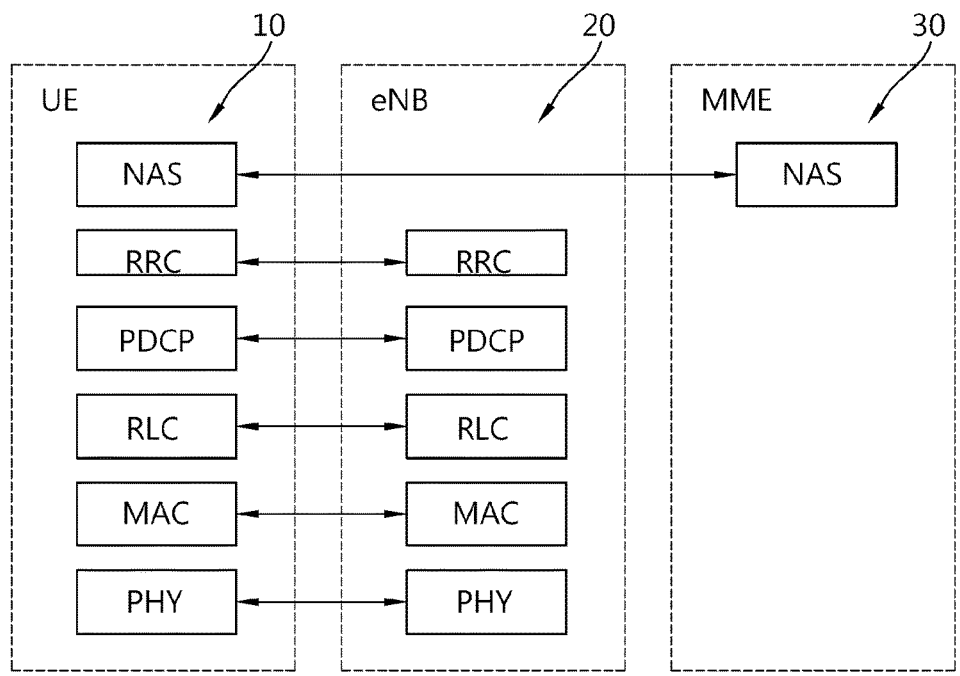

[Fig. 5]
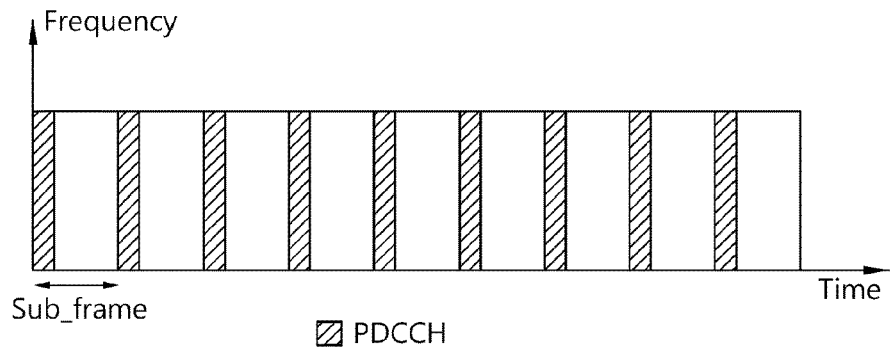
[Fig. 6]
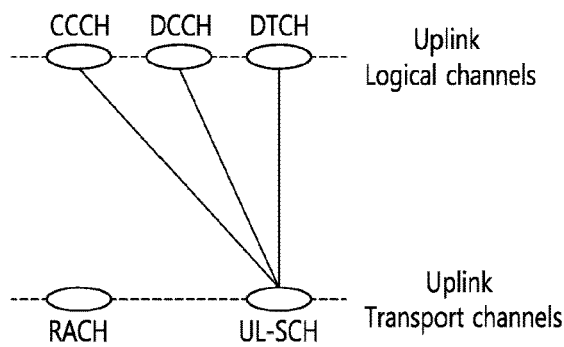
[Fig. 7]
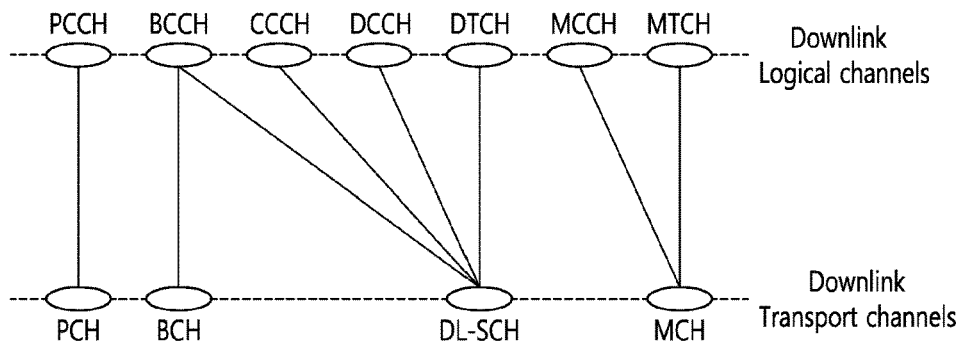
[Fig. 8]
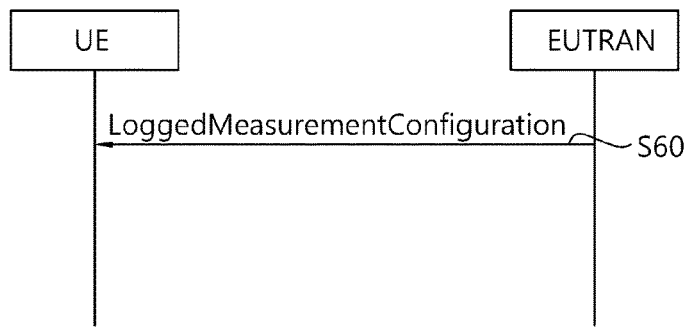

[Fig. 9]
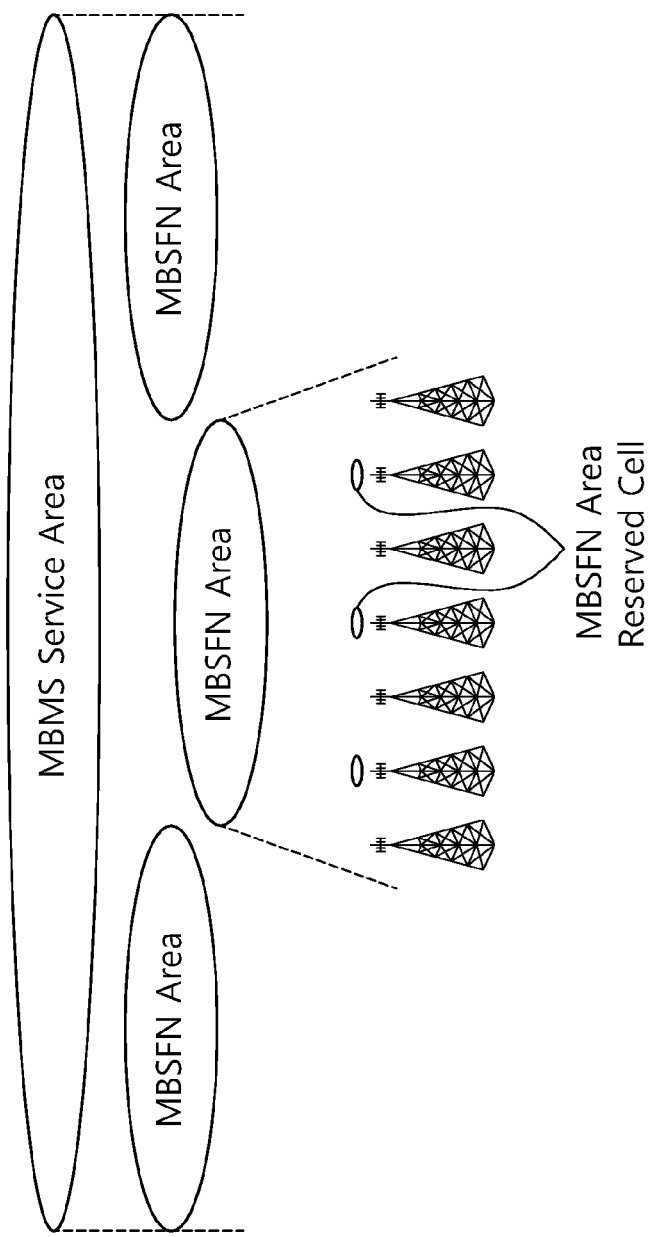

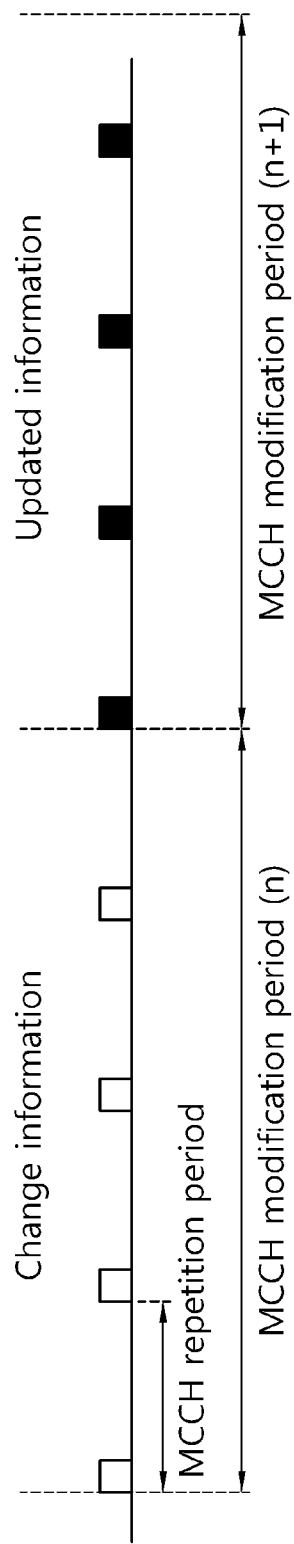
[Fig. 10]

[Fig. 11]
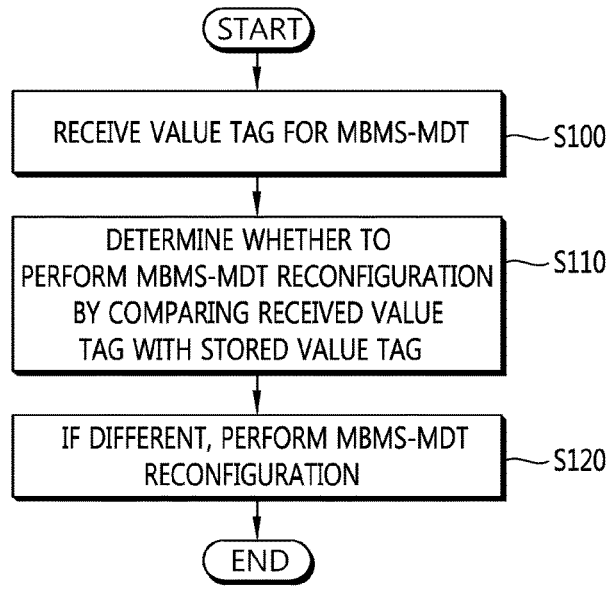
[Fig. 12]
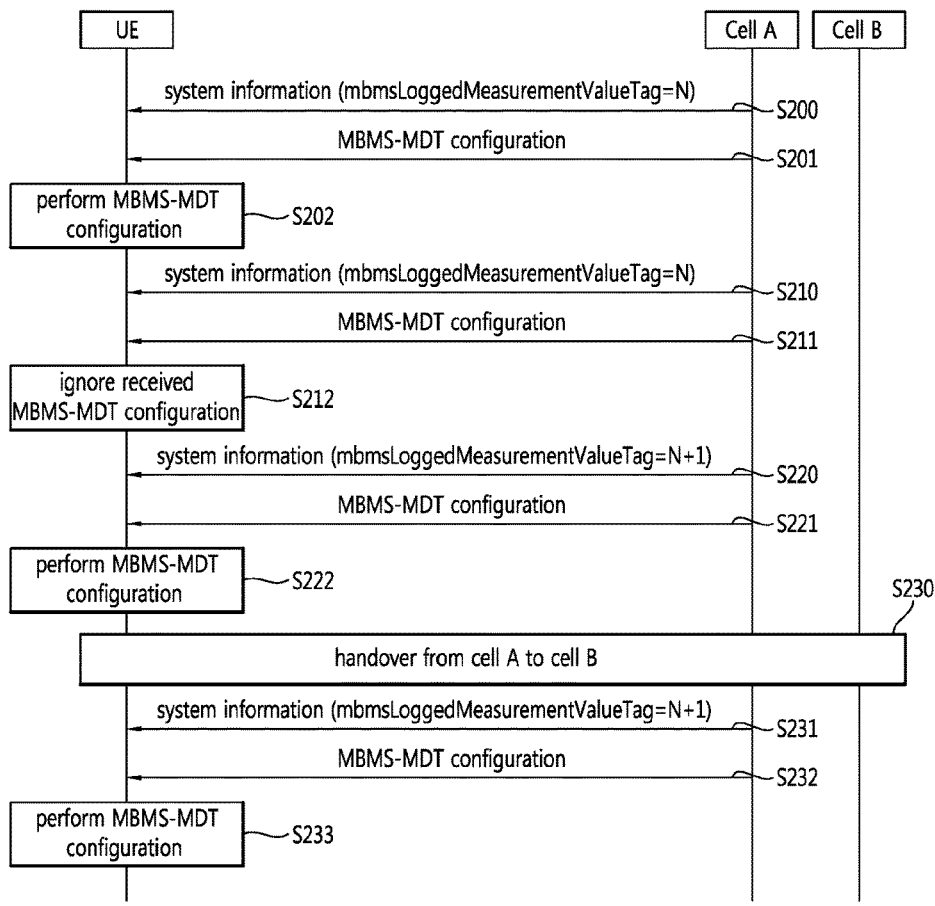

[Fig. 13]
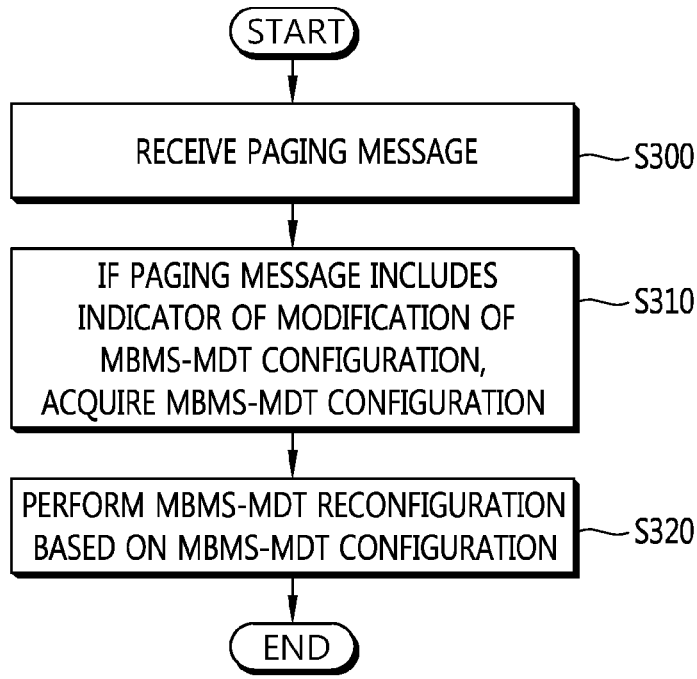
[Fig. 14]
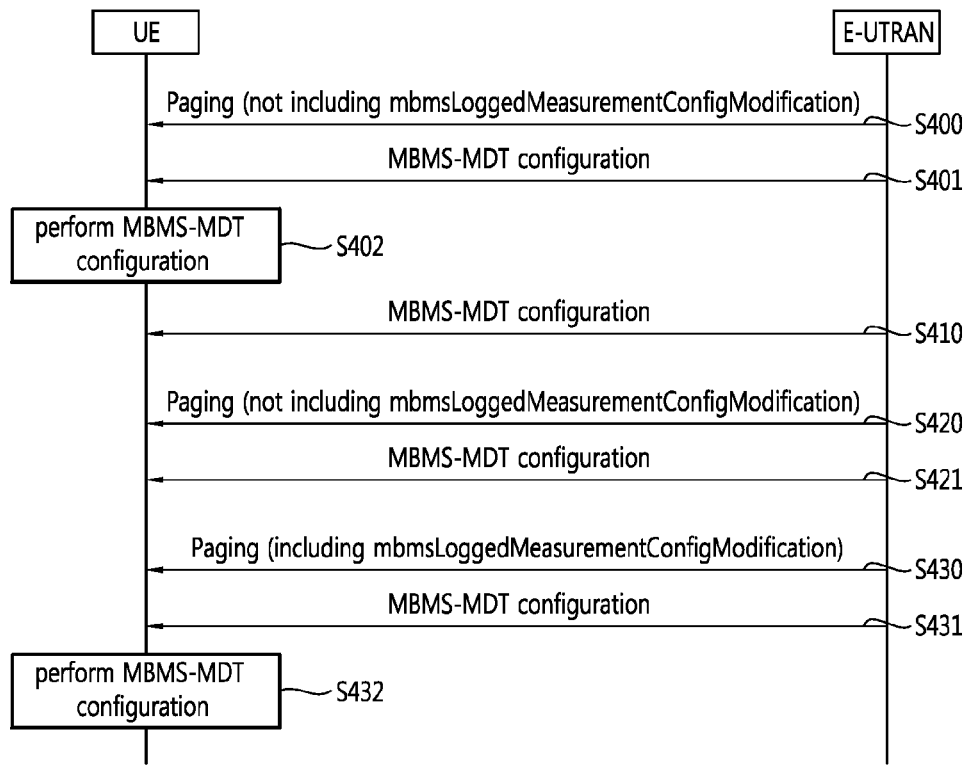

[Fig. 15]
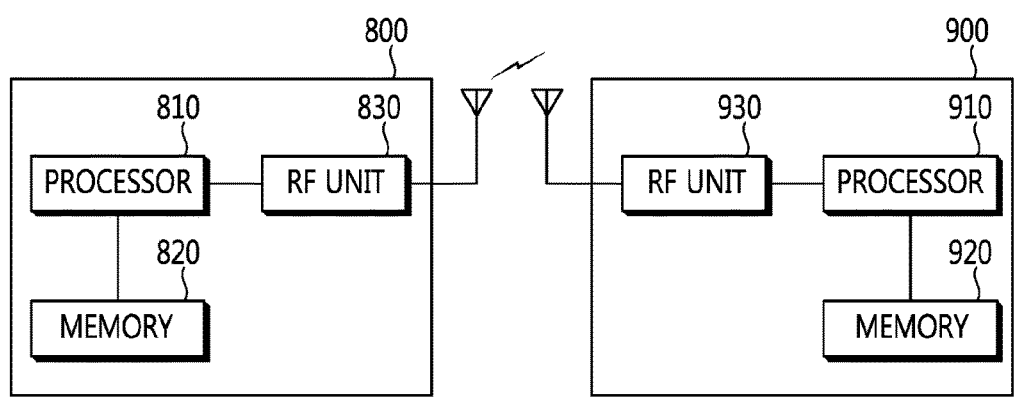

METHOD AND APPARATUS FOR RECONFIGURING MBMS MDT IN WIRELESS COMMUNICATION SYSTEM

CROSS REFERENCE TO RELATED APPLICATIONS

This application is the National Phase of PCT International Application No. PCT/KR2015/002060, filed on Mar. 4, 2015, which claims priority under 35 U.S.C. 119(e) to U.S. provisional application No. 61/952,887, filed on Mar. 14, 2014, all of which are hereby expressly incorporated by reference into the present application.

TECHNICAL FIELD

The present invention relates to wireless communications, and more particularly, to a method and apparatus for reconfiguring multimedia broadcast multicast service (MBMS) minimization of drive test (MDT) in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Minimization of drive tests (MDT) is a feature introduced in 3GPP LTE rel-10 to allow the harvesting of network coverage and quality information from customer user equipments (UEs) as they move within the coverage of the radio access network (RAN). This provides better quality data, at a lower cost, than that produced by the RAN operator performing drive testing of the RAN using test UEs.

MDT may be performed for MBMS. For MBMS-MDT, MBMS-MDT configuration may be provided by a network. The MBMS-MDT configuration may be provided by various methods, and according to the method for providing the MBMS-MDT configuration figuration, a method for configuring or reconfiguring MBMS-MDT may be defined differently.

SUMMARY OF INVENTION

Technical Problem

The present invention provides a method and apparatus for reconfiguring multimedia broadcast multicast service (MBMS) minimization of drive test (MDT) in a wireless communication system. The present invention provides a method for reconfiguring MBMS-MDT by using a value tag for MBMS-MDT configuration. The present invention provides a method for reconfiguring MBMS-MDT by using a paging message.

Solution to Problem

In an aspect, a method for reconfiguring, by a user equipment (UE), multimedia broadcast multicast service (MBMS) minimization of drive test (MDT) in a wireless communication system is provided. The method includes receiving, by the UE, a value tag for MBMS-MDT, determining, by the UE, whether to perform MBMS-MDT reconfiguration by comparing the received value tag for MBMS-MDT with a stored value tag for MBMS-MDT, and if the received value tag for MBMS-MDT and the stored value tag for MBMS-MDT are different from each other, performing, by the UE, the MBMS-MDT reconfiguration.

In another aspect, a method for reconfiguring, by a user equipment (UE), multimedia broadcast multicast service (MBMS) minimization of drive test (MDT) in a wireless communication system is provided. The method includes receiving, by the UE, a paging message, if the paging message includes an indicator of modification of a MBMS-MDT configuration, acquiring, by the UE, the MBMS-MDT configuration, and performing, by the UE, MBMS-MDT reconfiguration based on the acquired MBMS-MDT configuration.

Advantageous Effects of Invention

MBMS-MDT can be reconfigured only when necessary.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.
FIG. 4 shows a block diagram of a control plane protocol stack of an LTE system.
FIG. 5 shows an example of a physical channel structure.
FIG. 6 shows mapping between uplink logical channels and uplink transport channels.
FIG. 7 shows mapping between downlink logical channels and downlink transport channels.
FIG. 8 shows a logged measurement configuration procedure.
FIG. 9 shows MBMS definitions.
FIG. 10 shows change of MCCH information.
FIG. 11 shows an example of a method for reconfiguring MBMS-MDT according to an embodiment of the present invention.
FIG. 12 shows another example of a method for reconfiguring MBMS-MDT according to an embodiment of the present invention.

FIG. 13 shows another example of a method for reconfiguring MBMS-MDT according to an embodiment of the present invention.

FIG. 14 shows another example of a method for reconfiguring MBMS-MDT according to an embodiment of the present invention.

FIG. 15 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW).

The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The main services and functions of the MAC layer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between logical channels of one UE, priority handling between UEs by means of dynamic scheduling, multimedia broadcast multicast service (MBMS) service identification, transport format selection, and padding. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

Different kinds of data transfer services as offered by MAC layer. Each logical channel type is defined by what type of information is transferred. A general classification of logical channels is into two groups, which are control channels (for the transfer of control plane information), and traffic channels (for the transfer of user plane information). There is one MAC entity per cell. MAC layer generally consists of several function blocks (transmission scheduling functions, per UE functions, MBMS functions, MAC control functions, transport block generation . . . ). Transparent mode is only applied to broadcast control channel (BCCH) and paging control channel (PCCH).

Control channels are used for transfer of control plane information only. The control channels offered by the MAC layer include a BCCH, a PCCH, a common control channel (CCCH), a multicast control channel (MCCH) and a dedicated control channel (DCCH). The BCCH is a downlink channel for broadcasting system control information. The PCCH is a downlink channel that transfers paging information and system information change notifications. This channel is used for paging when the network does not know the location cell of the UE. The CCCH is a channel for transmitting control information between UEs and network. This channel is used for UEs having no RRC connection with the network. The MCCH is a point-to-multipoint downlink channel used for transmitting MBMS control information from the network to the UE, for one or several multicast traffic channels (MTCHs). This channel is only used by UEs that receive or are interested to receive MBMS. The DCCH is a point-to-point bi-directional channel that transmits dedicated control information between a UE and the network and used by UEs having an RRC connection.

Traffic channels are used for the transfer of user plane information only. The traffic channels offered by the MAC layer include a dedicated traffic channel (DTCH) and a multicast traffic channel (MTCH). The DTCH is a point-to-point channel, dedicated to one UE, for the transfer of user information. The DTCH can exist in both uplink and downlink The MTCH is a point-to-multipoint downlink channel for transmitting traffic data from the network to the UE. This channel is only used by UEs that receive MBMS.

FIG. 6 shows mapping between uplink logical channels and uplink transport channels. In uplink, CCCH can be mapped to UL-SCH, DCCH can be mapped to UL-SCH, and DTCH can be mapped to UL-SCH.

FIG. 7 shows mapping between downlink logical channels and downlink transport channels. In downlink, BCCH can be mapped to BCH, BCCH can be mapped to DL-SCH, PCCH can be mapped to PCH, CCCH can be mapped to DL-SCH, DCCH can be mapped to DL-SCH, DTCH can be mapped to DL-SCH, MTCH can be mapped to MCH, MCCH can be mapped to MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Minimization of drive tests (MDT) is described. In may be referred to 3GPP TS 37.320 V11.3.0 (2013-03). The general principles and requirements guiding the definition of functions for MDT are the following.

1. MDT mode: There are two modes for the MDT measurements, which are logged MDT and immediate MDT. The logged MDT is MDT functionality involving measurement logging by the UE in IDLE mode, CELL PCH and URA PCH states (when the UE is in UTRA) for reporting to eNB/radio network controller (RNC) at a later point in time. The immediate MDT is MDT functionality involving measurements performed by the UE in CONNECTED state and reporting of the measurements to eNB/RNC available at the time of reporting condition as well as measurements by the network for MDT purposes. There are also cases of measurement collection not specified as either immediate or logged MDT, such as accessibility measurements.

2. UE measurement configuration: It is possible to configure MDT measurements for the UE logging purpose independently from the network configurations for normal radio resource management (RRM) purposes. However, in most cases, the availability of measurement results is conditionally dependent on the UE RRM configuration.

3. UE measurement collection and reporting: UE MDT measurement logs consist of multiple events and measurements taken over time. The time interval for measurement collection and reporting is decoupled in order to limit the impact on the UE battery consumption and network signaling load.

4. Geographical scope of measurement logging: It is possible to configure the geographical area where the defined set of measurements shall be collected.

5. Location information: The measurements shall be linked to available location information and/or other information or measurements that can be used to derive location information.

6. Time information: The measurements in measurement logs shall be linked to a time stamp.

7. UE capability information: The network may use UE capabilities to select terminals for MDT measurements.

8. Dependency on self-optimizing network (SON): The solutions for MDT are able to work independently from SON support in the network. Relation between measurements/solution for MDT and UE side SON functions shall be established in a way that re-use of functions is achieved where possible.

9. Dependency on TRACE: The subscriber/cell trace functionality is reused and extended to support MDT. If the MDT is initiated toward to a specific UE (e.g., based on international mobile subscriber identity (IMSI), international mobile station equipment identity (IMEI) software version (SV), etc.), the signalling based trace procedure is used, otherwise the management based trace procedure (or cell traffic trace procedure) is used.

The solutions for MDT shall take into account the following constraints:

1. UE measurements: The UE measurement logging mechanism is an optional feature. In order to limit the impact on UE power consumption and processing, the UE measurement logging should as much as possible rely on the measurements that are available in the UE according to radio resource management enforced by the access network.

2. Location information: The availability of location information is subject to UE capability and/or UE implementation. Solutions requiring location information shall take into account power consumption of the UE due to the need to run its positioning components.

Logged MDT procedure is described. Support of logged MDT complies with the principles for idle mode measurements in the UE. Furthermore, measurement logging is differentiated based on UE states in idle mode, i.e. camped normally, any cell selection or camped on any cell. The UE shall perform measurement logging in "camped normally" state. In "any cell selection" and "camped on any cell" state the UE is not required to perform MDT measurement logging (including time and location information). For logged MDT, the configuration, measurement collection and reporting of the concerning measurement will always be done in cells of the same RAT type.

FIG. 8 shows a logged measurement configuration procedure. The purpose of the logged measurement procedure is to configure the UE to perform logging of measurement results while in RRC IDLE. The logged measurement procedure applies to logged measurements capable UEs that are in RRC_CONNECTED. In step S60, the E-UTRAN initiates the logged measurement configuration procedure to the UE in RRC_CONNECTED by sending the LoggedMeasurementConfiguration message, which is used to transfer configuration parameters for logged MDT. This is a unidirectional RRC signaling procedure. A release operation for logged measurement configuration in the UE is realized only by configuration replacement when the configuration is overwritten or by configuration clearance in case a duration timer stopping or expiration condition is met.

Upon receiving the LoggedMeasurementConfiguration message, the UE shall:

1>discard the logged measurement configuration as well as the logged measurement information;

1>store the received loggingDuration, loggingInterval and areaConfiguration, if included, in VarLogMeasConfig;
1>if the LoggedMeasurementConfiguration message includes plmn-IdentityList;
2>set plmn-IdentityList in VarLogMeasReport to include the registered PLMN (RPLMN) as well as the PLMNs included in plmn-IdentityList;
1>else:
2>set plmn-IdentityList in VarLogMeasReport to include the RPLMN;
1>store the received absoluteTimeInfo,traceReference, traceRecordingSessionRef and tce-Id in VarLogMeasReport;
1>start timer T330 with the timer value set to the loggingDuration;
Upon expiry of T330, the UE shall:
1>release VarLogMeasConfig;
The UE is allowed to discard stored logged measurements, i.e. to release VarLogMeasReport 48 hours after T330 expiry.

Release of logged measurement configuration procedure may release the logged measurement configuration as well as the logged measurement information. The UE shall initiate the release of logged measurement configuration procedure upon receiving a logged measurement configuration in another RAT. The UE shall also initiate the procedure upon power off or detach. The UE shall:
1>stop timer T330, if running;
1>if stored, discard the logged measurement configuration as well as the logged measurement information, i.e. release the UE variables VarLogMeasConfig and VarLogMeasReport;

Measurements logging procedure specifies the logging of available measurements by a UE in RRC IDLE that has a logged measurement configuration. While T330 is running, the UE shall:
1>perform the logging in accordance with the following:
2>if the UE is camping normally on an E-UTRA cell and if the RPLMN is included in plmn-IdentityList stored in VarLogMeasReport and, if the cell is part of the area indicated by areaConfiguration if configured in VarLogMeasConfig:
3>perform the logging at regular time intervals, as defined by the loggingInterval in VarLogMeasConfig;
2>when adding a logged measurement entry in VarLogMeasReport, include the fields in accordance with the following:
3>set the relativeTimeStamp to indicate the elapsed time since the moment at which the logged measurement configuration was received;
3>if detailed location information became available during the last logging interval, set the content of the locationInfo as follows:
4>include the location Coordinates;
4>if available, include the uncertainty;
4>if available, include the confidence;
3>set the servCellIdentity to indicate global cell identity of the cell the UE is camping on;
3>set the measResultServCell to include the quantities of the cell the UE is camping on;
3>if available, set the measResultNeighCells, in order of decreasing ranking-criterion as used for cell re-selection, to include neighbouring cell measurements that became available during the last logging interval for at most the following number of neighbouring cells; 6 intra-frequency and 3 inter-frequency neighbours per frequency as well as 3 inter-RAT neighbours, per frequency/ set of frequencies (GERAN) per RAT;
2>when the memory reserved for the logged measurement information becomes full, stop timer T330 and perform the same actions as performed upon expiry of T330;

MBMS is described. It may be referred to Section 15 of 3GPP TS 36.300 V11.7.0 (2013-09) and Section 5.8 of 3GPP TS 36.331 V11.5.0 (2013-09).

FIG. 9 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

In E-UTRAN, MBMS can be provided with single frequency network mode of operation (MBSFN) only on a frequency layer shared with non-MBMS services (set of cells supporting both unicast and MBMS transmissions, i.e., set of "MBMS/Unicast-mixed cells"). MBMS reception is possible for UEs in RRC_CONNECTED or RRC_IDLE states. Whenever receiving MBMS services, a user shall be notified of an incoming call, and originating calls shall be possible. Robust header compression (ROHC) is not supported for MBMS. Relay nodes (RNs) do not support MBMS.

Multi-cell transmission of MBMS is characterized by:
Synchronous transmission of MBMS within its MBSFN area;
Combining of MBMS transmission from multiple cells is supported;
Scheduling of each MCH is done by the MCE;
A single transmission is used for MCH (i.e. neither blind HARQ repetitions nor RLC quick repeat);
A single transport block (TB) is used per TTI for MCH transmission, that TB uses all the MBSFN resources in that subframe;
MTCH and MCCH can be multiplexed on the same MCH and are mapped on MCH for point-to-multipoint (PTM) transmission;
MTCH and MCCH use the RLC unacknowledged mode (UM);
The MAC subheader indicates the logical channel ID (LCID) for MTCH and MCCH;
The MBSFN synchronization area, the MBSFN area, and the MBSFN cells are semi-statically configured, e.g. by O&M;
MBSFN areas are static, unless changed by O&M (i.e. no dynamic change of areas);
Multiple MBMS services can be mapped to the same MCH and one MCH contains data belonging to only one MBSFN area. An MBSFN area contains one or more MCHs. An MCH specific MCS is used for all subframes of the MCH that do not use the MCS indicated in BCCH. All MCHs have the same coverage area.

For MCCH and MTCH, the UE shall not perform RLC re-establishment at cell change between cells of the same MBSFN area. Within the MBSFN subframes, all MCHs within the same MBSFN area occupy a pattern of subframes, not necessarily adjacent in time, which is common for all these MCHs and is therefore called the common subframe allocation (CSA) pattern. The CSA pattern is periodically repeated with the CSA period. The actual MCH subframe allocation (MSA) for every MCH carrying MTCH is defined by the CSA pattern, the CSA period, and the MSA end, that are all signaled on MCCH. The MSA end indicates the last subframe of the MCH within the CSA period. Consequently, the MCHs are time multiplexed within the CSA period, which finally defines the interleaving degree between the MCHs. It shall be possible for MCHs to not use all MBSFN resources signaled as part of the Rel-8 MBSFN signaling. Further, such MBSFN resource can be shared for more than one purpose (MBMS, positioning, etc.). During one MCH scheduling period (MSP), which is configurable per MCH, the eNB applies MAC multiplexing of different MTCHs and optionally MCCH to be transmitted on this MCH.

MCH scheduling information (MSI) is provided per MCH to indicate which subframes are used by each MTCH during the MSP. The following principles are used for the MSI:
it is used both when services are multiplexed onto the MCH and when only a single service is transmitted on the MCH;
it is generated by the eNB and provided once at the beginning of the MSP;
it has higher scheduling priority than the MCCH and, when needed, it appears first in the PDU;
it allows the receiver to determine what subframes are used by every MTCH, sessions are scheduled in the order in which they are included in the MCCH session list;
it is carried in a MAC control element which cannot be segmented;
it carries the mapping of MTCHs to the subframes of the associated MSP. This mapping is based on the indexing of subframes belonging to one MSP.

The content synchronization for multi-cell transmission is provided by the following principles:

1. All eNBs in a given MBSFN synchronization area have a synchronized radio frame timing such that the radio frames are transmitted at the same time and have the same SFN.

2. All eNBs have the same configuration of RLC/MAC/PHY for each MBMS service, and identical information (e.g. time information, transmission order/priority information) such that synchronized MCH scheduling in the eNBs is ensured. These are indicated in advance by the MCE.

3. An enhanced MBMS (E-MBMS) gateway (GW) sends/broadcasts MBMS packet with the SYNC protocol to each eNB transmitting the service.

4. The SYNC protocol provides additional information so that the eNBs identify the transmission radio frame(s). The E-MBMS GW does not need accurate knowledge of radio resource allocation in terms of exact time division (e.g. exact start time of the radio frame transmission).

5. The eNB buffers MBMS packet and waits for the transmission timing indicated in the SYNC protocol.

6. The segmentation/concatenation is needed for MBMS packets and should be totally up to the RLC/MAC layer in eNB.

7. The SYNC protocol provides means to detect packet loss(es) and supports a recovery mechanism robust against loss of consecutive PDU packets (MBMS packets with SYNC header).

8. For the packet loss case the transmission of radio blocks potentially impacted by the lost packet should be muted.

9. The mechanism supports indication or detection of MBMS data burst termination (e.g. to identify and alternately use available spare resources related to pauses in the MBMS PDU data flow).

10. If two or more consecutive SYNC SDUs within a SYNC bearer are not received by the eNB, or if no SYNC PDUs of Type 0 or 3 are received for some synchronization sequence, the eNB may mute the exact subframes impacted by lost SYNC PDUs using information provided by SYNC protocol. If not muting only those exact subframes, the eNB stops transmitting the associated MCH from the subframe corresponding to the consecutive losses until the end of the corresponding MSP and it does not transmit in the subframe corresponding to the MSI of that MSP.

11. The eNB sets VT(US) to zero in the RLC UM entity corresponding to an MCCH at its modification period boundary.

12. The eNB sets VT(US) to zero in each RLC UM entity corresponding to an
MTCH at the beginning of its MSP.

13. The eNB sets every bit in the MAC padding on MCH to "0".

14. The eNB's RLC concatenates as many RLC SDUs from the same radio bearer as possible.

15. The eNB's MAC multiplexes as many RLC PDUs as fit in the transport block.

The following principles govern the MCCH structure:
One MBSFN area is associated with one MCCH and one MCCH corresponds to one MBSFN area;
The MCCH is sent on MCH;
MCCH consists of a single MBSFN area configuration RRC message which lists all the MBMS services with ongoing sessions and an optional MBMS counting request message;

MCCH is transmitted by all cells within an MBSFN area, except the MBSFN area reserved cells;

MCCH is transmitted by RRC every MCCH repetition period;

MCCH uses a modification period;

A notification mechanism is used to announce changes of MCCH due to either session start or the presence of an MBMS counting request message: The notification is sent periodically throughout the modification period preceding the change of MCCH, in MBSFN subframes configured for notification. The downlink control information (DCI) format 1C with MBMS radio network temporary identity (M-RNTI) is used for notification and includes an 8-bit bitmap to indicate the one or more MBSFN area(s) in which the MCCH change(s). The UE monitors more than one notification subframe per modification period. When the UE receives a notification, it acquires the MCCH at the next modification period boundary;

The UE detects changes to MCCH which are not announced by the notification mechanism by MCCH monitoring at the modification period.

For MBMS signaling no BCCH, BCCH only points to the resources where the MCCH(s) can be found, i.e. it does not indicate the availability of the services. For each MCCH, BCCH indicates independently the scheduling of the MCCH for multi-cell transmission on MCH, the MCCH modification period, repetition period radio frame offset and subframe allocation, and an MCS which applies to the subframes indicated for MCCH scheduling and for the first subframe of all MSPs in that MBSFN area. For the notification commonly used for all MCCH, BCCH configures the position of the MCCH change notification subframe and the number of occasions monitored by the UE, and indicates the mapping between the PDCCH bit(s) carried in the notification and the MCCH(s).

In general, the control information relevant only for UEs supporting MBMS is separated as much as possible from unicast control information. Most of the MBMS control rmation is provided on a logical channel specific for MBMS common control rmation: the MCCH. E-UTRA employs one MCCH logical channel per MBSFN area. In case the network configures multiple MBSFN areas, the UE acquires the MBMS control rmation from the MCCHs that are configured to identify if services it is interested to receive are ongoing. An MBMS capable UE may be only required to support reception of a single MBMS service at a time. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC CONNECTED that are receiving or interested to receive one or more specific MBMS services.

A limited amount of MBMS control rmation is provided on the BCCH. This primarily concerns the rmation needed to acquire the MCCH(s). This rmation is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH rmation is transmitted periodically, using a configurable repetition period. Scheduling rmation is not provided for MCCH, i.e. both the time domain scheduling as well as the lower layer configuration are semi-statically configured, as defined within SystemInformationBlockType13.

For MBMS user data, which is carried by the MTCH logical channel, E-UTRAN periodically provides MSI at lower layers (MAC). This MCH rmation only concerns the time domain scheduling, i.e. the frequency domain scheduling and the lower layer configuration are semi-statically configured. The periodicity of the MSI is configurable and defined by the MCH scheduling period.

Change of MCCH rmation only occurs at specific radio frames, i.e. the concept of a modification period is used. Within a modification period, the same MCCH rmation may be transmitted a number of times, as defined by its scheduling (which is based on a repetition period). The modification period boundaries are defined by system frame number (SFN) values for which SFN mod m=0, where m is the number of radio frames comprising the modification period. The modification period is configured by means of SystemInformationBlockType13.

FIG. 10 shows change of MCCH information. When the network changes (some of) the MCCH rmation, it notifies the UEs about the change during a first modification period. In the next modification period, the network transmits the updated MCCH rmation. In FIG. 8, different colors indicate different MCCH rmation. Upon receiving a change notification, a UE interested to receive MBMS services acquires the new MCCH rmation immediately from the start of the next modification period. The UE applies the previously acquired MCCH rmation until the UE acquires the new MCCH rmation.

Indication of an MBMS specific RNTI, the M-RNTI, on PDCCH is used to rm UEs in RRC IDLE and UEs in RRC CONNECTED about an MCCH rmation change. When receiving an MCCH rmation change notification, the UE knows that the MCCH rmation will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided, e.g. regarding which MCCH rmation will change. The MCCH rmation change notification is used to rm the UE about a change of MCCH rmation upon session start or about the start of MBMS counting.

The MCCH rmation change notifications on PDCCH are transmitted periodically and are carried on MBSFN subframes only. These MCCH rmation change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

A UE that is receiving an MBMS service shall acquire the MCCH rmation from the start of each modification period. A UE that is not receiving an MBMS service, as well as UEs that are receiving an MBMS service but potentially interested to receive other services not started yet in another MBSFN area, shall verify that the stored MCCH rmation remains valid by attempting to find the MCCH rmation change notification at least notificationRepetitionCoeff times during the modification period of the applicable MCCH(s), if no MCCH rmation change notification is received.

Logged MDT procedure may be performed for MBMS. Hereinafter, the logged MDT procedure for MBMS may be referred to as MBMS-MDT. For MBMS-MDT, the logged measurement configuration procedure for described in FIG. 8 may be performed in order to log of measurement results for MBSFN in both RRC_IDLE and RRC_CONNECTED. Further, for MBMS-MDT, the measurements logging procedure specifies the logging of available measurements by a UE in RRC_IDLE that has a logged measurement configuration and the logging of available measurements by a UE in both RRC_IDLE and RRC_CONNECTED if targetMBSFN-AreaList is included in VarLogMeasConfig.

MDT configuration message, i.e. the LoggedMeasurementConfiguration message, is transmitted via DCCH, as shown in FIG. 8. Accordingly, MBMS-MDT configuration message may be also transmitted via DCCH. Alternatively, the MBMS-MDT configuration message may be transmitted via MCCH or BCCH. In this case, the MBMS-MDT configuration message may be re-transmitted many times though it was not changed. But, the UE cannot know whether the received MBMS-MDT configuration message is for re-configuration or not. Therefore, the UE will always discard the logged measurement configuration as well as the logged measurement information whenever the MBMS-MDT configuration message is re-transmitted via MCCH or BCCH.

In order to solve the problem described above, a method for reconfiguring MBMS-MDT according to an embodiment of the present invention is described. According to an embodiment of the present invention, the MBMS-MDT configuration may be applied only when necessary by using a value tag for MBMS-MDT or an indicator of modification of the MBMS-MDT configuration.

1. Using a Value Tag for MBMS-MDT Configuration: The UE considers the MBSM-MDT is needed to be re-configured only if a received value tag, i.e. mbmsLoggedMeasurementValueTag, is different from the stored value tag. The mbmsLoggedMeasurementValueTag may indicate if a change has occurred in the MBMS-MDT configuration.

FIG. 11 shows an example of a method for reconfiguring MBMS-MDT according to an embodiment of the present invention.

In step S100, the UE receives the value tag for the MBMS-MDT, i.e. mbmsLoggedMeasurementValueTag. The mbmsLoggedMeasurementValueTag may be signaled by various methods. First, the mbmsLoggedMeasurementValueTag may be configured by using BCCH. If the MBMS-MDT is configured via BCCH by the network, the mbmsLoggedMeasurementValueTag may be received via the existing system information, e.g. system information block (SIB)1, SIB2, etc. Or, new SIB may be defined for the MBMS-MDT configuration, and the mbmsLoggedMeasurementValueTag may be received via the newly defined SIB. In this case, the modification period of the MBMS-MDT configuration may be the same as that of existing system information. Alternatively, the mbmsLoggedMeasurementValueTag may be configured by using MCCH. If the MBMS-MDT is configured via MCCH by the network, the mbmsLoggedMeasurementValueTag may be received via the MBSFNAreaConfiguration message. Or, new message transmitted via MCCH may be defined for the MBMS-MDT configuration, and the mbmsLoggedMeasurementValueTag may be received via the newly defined message. In this case, the modification period of the MBMS-MDT configuration is the same as that of existing MCCH. Further, cells included in the same MBSFN area may use synchronized mbmsLoggedMeasurementValueTag. The synchronization can be done by operations, administration and maintenance (OAM), MCE or BM-SC.

In next modification period, the UE receives the MBMS-MDT configuration. In step S110, the UE determines whether to perform the MBMS-MDT configuration/reconfiguration. For example, the UE may determine whether to perform the MBMS-MDT reconfiguration by comparing received mbmsLoggedMeasurementValueTag with the stored mbmsLoggedMeasurementValueTag. If the received mbmsLoggedMeasurementValueTag is different from the stored one, in step S120, the UE may perform the MBMS-MDT reconfiguration according to the received MBMS-MDT configuration. If the received mbmsLoggedMeasurementValueTag is the same as the stored one, the UE may ignore the received MBMS-MDT configuration.

Alternatively, the UE may determine whether to receive the MBMS-MDT configuration. If the received mbmsLoggedMeasurementValueTag is different from the stored one, the UE may determine to receive the MBMS-MDT configuration from the network in the next modification period. If the received mbmsLoggedMeasurementValueTag is the same as the stored one, UE may determine not to receive the MBMS-MDT configuration. In the next modification period, the UE receives the MBMS MDT configuration. The UE performs MBMS-MDT reconfiguration according to the received MBMS-MDT configuration. If the received mbmsLoggedMeasurementValueTag is the same as the stored one and the UE receives the MBMS-MDT configuration figuration, the UE does not perform the MBMS-MDT reconfiguration.

Performing MBMS-MDT reconfiguration may include discarding the logged measurement configuration as well as the logged measurement information, storing the received information included in the MBMS-MDT configuration, and starting timer related to logging duration. The MBMS-MDT may include performing MBMS measurements, logging measurement results and reporting logged results. The MBMS measurements to be performed by the UE for the MBMS-MDT may include MBSFN reference signal received power (RSRP)/reference signal received quality (RSRQ) per MBSFN area, MCH block error rate (BLER) per MCS, per MCH, and per MBSFN area, and/or the amount of received RLC SDUs for a certain period of time.

FIG. 12 shows another example of a method for reconfiguring MBMS-MDT according to an embodiment of the present invention.

In step S200, the UE receives system information including mbmsLoggedMeasurementValueTag. The mbmsLoggedMeasurementValueTag is N. It is further assumed that the UE is not configured to perform MBMS-MDT and it is not performing any operation related to the MBMS-MDT. In step S201, in the next modification period, the UE receives system information including the MBMS-MDT configuration. In step S202, the UE performs MBMS-MDT configuration according to the received MBMS-MDT configuration.

In step S210, the UE receives system information including mbmsLoggedMeasurementValueTag. The mbmsLoggedMeasurementValueTag is not changed (i.e. N). In step S211, in the next modification period, the UE receives system information including the MBMS-MDT configuration. In step S212, since the mbmsLoggedMeasurementValueTag is not changed, the UE ignores the received MBMS-MDT configuration and keep maintaining current MBMS-MDT configuration.

In step S220, the UE receives system information including mbmsLoggedMeasurementValueTag. The mbmsLoggedMeasurementValueTag is changed to N+1. In step S221, in the next modification period, the UE receives system information including the MBMS-MDT configuration. In step S222, since the mbmsLoggedMeasurementValueTag is changed, the UE performs MBMS-MDT reconfiguration according to the received MBMS-MDT configuration.

In step S230, the UE is handed over from cell A to cell B. In step S231, the UE receives system information including mbmsLoggedMeasurementValueTag from the cell B. The mbmsLoggedMeasurementValueTag is not changed. In step S232, in the next modification period, the UE receives system information including the MBMS-MDT configuration. In step S233, since the mbmsLoggedMeasurementValueTag is not changed, the UE ignores the received MBMS-MDT configuration and keep maintaining current MBMS-MDT configuration.

2. Using a Paging Message

FIG. 13 shows another example of a method for reconfiguring MBMS-MDT according to an embodiment of the present invention. In step S300, the UE received a paging message. In step S310, if the paging message includes an indicator of modification of the MBMS-MDT configuration, the UE acquires the MBMS-MDT configuration. In step S320, the UE performs MBMS-MDT reconfiguration based on the acquired MBMS-MDT configuration.

More specifically, for the UE which is configured to perform the MBMS MDT, if the UE receives the paging message including the indicator of modification of the MBMS-MDT configuration, i.e. mbmsLoggedMeasurementConfigModification, the UE acquires the required system information related to the MBMS-MDT configuration. Meanwhile, if the UE receives the paging message not including the mbmsLoggedMeasurementConfigModification, the UE doesn't acquire the required system information related to the MBMS-MDT configuration. Or, the UE may ignore the system information related to the MBMS-MDT configuration after receiving it. The mbmsLoggedMeasurementConfigModification may indicate whether the MBMS-MDT configuration will change at the next modification period boundary. For the UE which is not configured to perform the MBMS MDT, the UE acquires the required system information related to the MBMS-MDT configuration regardless of the presence of the mbmsLoggedMeasurementConfigModification.

FIG. 14 shows another example of a method for reconfiguring MBMS-MDT according to an embodiment of the present invention.

In step S400, the UE receives the paging message not including mbmsLoggedMeasurementConfigModification. The UE is not performing any operation related to the MBMS-MDT. In step S401, the UE receives the MBMS-MDT configuration. In step S402, the UE configures the MBMS-MDT according to the received MBMS-MDT configuration and starts to perform the MBMS-MDT.

In step S410, the UE receives the MBMS-MDT configuration without reading the paging message. Therefore, the UE ignore the received MBMS-MDT configuration.

In step S420, the UE receives the paging message not including mbmsLoggedMeasurementConfigModification. In step S421, the UE receives the MBMS-MDT configuration though the paging message which does not include the mbmsLoggedMeasurementConfigModification. The UE was configured to perform the MBMS-MDT. So, the UE ignores the received MBMS-MDT configuration.

In step S430, the UE receives the paging message including mbmsLoggedMeasurementConfigModification. In step S431, the UE receives the MBMS-MDT configuration. In step S432, the UE reconfigures the MBMS-MDT according to the received MBMS-MDT configuration.

FIG. 15 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for reconfiguring, by a user equipment (UE), multimedia broadcast multicast service (MBMS) minimization of drive test (MDT) in a wireless communication system, the method comprising:

receiving, by the UE, a value tag for MBMS-MDT from a network;

determining, by the UE, whether to perform MBMS-MDT reconfiguration by comparing the received value tag for MBMS-MDT with a stored value tag for MBMS-MDT;

if the received value tag for MBMS-MDT and the stored value tag for MBMS-MDT are different from each other, receiving, by the UE, MBMS-MDT configuration from the network in a next modification period; and upon receiving the MBMS-MDT configuration, performing, by the UE, the MBMS-MDT reconfiguration based on the received MBMS-MDT configuration.

2. The method of claim 1, wherein the MBMS-MDT configuration is received via a broadcast control channel (BCCH) or a multicast control channel (MCCH).

3. The method of claim 1, wherein the value tag for MBMS-MDT is received via system information.

4. The method of claim 1, wherein the value tag for MBMS-MDT is received via a multicast-broadcast single-frequency network (MBSFN) area configuration message or a new multicast control channel (MCCH) message.

5. The method of claim 1, wherein the value tag for MBMS-MDT is synchronized in cells included in a same multicast-broadcast single-frequency network (MBSFN) area.

6. The method of claim 1, wherein performing the MBMS-MDT reconfiguration includes at least one of discarding logged measurement configuration as well as logged measurement information, storing information included in the MBMS-MDT configuration, or starting a timer related to a logging duration.

7. The method of claim 1, wherein the MBMS-MDT includes performing MBMS measurements, logging measurement results and reporting logged results.

8. The method of claim 7, wherein the MBMS measurements include at least one of a MBSFN reference signal received power (RSRP) per MBSFN area, a multicast-broadcast single-frequency network (MBSFN) reference signal received quality (RSRQ) per MBSFN area, multicast channel (MCH) block error rate (BLER) per modulation and coding scheme (MCS), per MCH, and per MBSFN area, or amount of received radio link control (RLC) service data units (SDUs) for a certain period of time.

* * * * *